United States Patent
Yadav

(10) Patent No.: US 7,464,238 B1
(45) Date of Patent: Dec. 9, 2008

(54) SYSTEM AND METHOD FOR VERIFYING THE CONSISTENCY OF MIRRORED DATA SETS

(75) Inventor: Vikas Yadav, Sunnyvale, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 264 days.

(21) Appl. No.: 11/414,051

(22) Filed: Apr. 28, 2006

(51) Int. Cl.
*G06F 12/00* (2006.01)

(52) U.S. Cl. ...................... 711/162; 711/114

(58) Field of Classification Search ........... None
See application file for complete search history.

(56) References Cited

U.S. PATENT DOCUMENTS

| | | | |
|---|---|---|---|
| 4,570,217 A | | 2/1986 | Allen et al. |
| 5,163,131 A | | 11/1992 | Row et al. |
| 5,202,979 A | | 4/1993 | Hillis et al. |
| 5,278,979 A | | 1/1994 | Foster et al. |
| 5,403,639 A | | 4/1995 | Belsan et al. |
| 5,410,667 A | | 4/1995 | Belsan et al. |
| 5,819,292 A | | 10/1998 | Hitz et al. |
| 6,493,796 B1 | * | 12/2002 | Arnon et al. ............ 711/114 |
| 6,643,654 B1 | | 11/2003 | Patel et al. |
| 7,007,046 B2 | | 2/2006 | Manley et al. |
| 7,225,204 B2 | | 5/2007 | Manley et al. |
| 2002/0083037 A1 | | 6/2002 | Lewis et al. |
| 2003/0182317 A1 | * | 9/2003 | Kahn et al. ........... 707/200 |
| 2004/0024808 A1 | * | 2/2004 | Taguchi et al. .......... 709/203 |
| 2004/0030668 A1 | | 2/2004 | Pawlowski et al. |
| 2007/0185928 A1 | * | 8/2007 | Davis et al. ........... 707/203 |

OTHER PUBLICATIONS

U.S. Appl. No. 10/776,057, filed Feb. 11, 2004, Ting et al.
Akyurek, Sedat, *Placing Replicated Data to Reduce Seek Delays*, De-partment of Computer Science, University of Maryland, UMIACS-TR-91-121, CS-TR-2746, Aug. 1991.
Bitton, Dina, *Disk Shadowing*, Proceedings of the 14th VLDB Conference, LA, CA 1988.
Chaudhuri, Surajit, et al., *Self-Tuning Technology in Microsoft SQL Server*, Data Engineering Journal 22, Feb. 1999 pp. 20-27.
Chutani, Sailesh, et al., *The Episode File System*, In Proceedings of the USENIX Winter 1992.
Coyne, Robert A., et al., *Storage Systems for National Information As-sets*, Proc. Supercomputing 92, Minneapolis, Nov. 1992, pp. 626-633.
Finlayson, Ross S., et al., *Log Files: An Extended File Service Exploit-ing Write-Once Storage* Department of Computer Science, Stanford University, Report No. STAN-CS-87-1177, Sep. 1987.
Gray, Jim, et al., *The Recovery Manager of the System R Database Man-ager*, ACM Computing Surveys, (13)2:223-242 1981.

(Continued)

*Primary Examiner*—Kevin Verbrugge
(74) *Attorney, Agent, or Firm*—Cesari and McKenna LLP

(57) ABSTRACT

A system and method for verifying the consistency of mirrored data sets is provided. A verification module executed on a destination storage system transmits a list of desired persistent consistency point images (PCPIs) to a source destination storage system. The source destination storage system identifies a common subset of PCPIs and returns a list of the common subset to the destination. The destination initiates a separate connection for each PCPI in the common subset. The source then generates a data stream which is transmitted to the destination for use in verifying the PCPIs.

27 Claims, 8 Drawing Sheets

OTHER PUBLICATIONS

Hecht, Matthew S., et al. *Shadowed Management of Free Disk Pages with a Linked List*, ACM Transactions on Database Systems, 8/4, Dec. 1983, pp. 503-514.

Howard, John, H. et al., *Scale and Performance in a Distributed File System*, Carnegie Mellon University, CMU-ITC-87-068, Aug. 1987.

Howard, John H., *An Overview of the Andrew File System*, Carne-gie Mellon University, CMU-ITC-88-062 1988.

Howard, John, H. et al., *Scale and Performance in a Distributed File System*, ACM Trans. Computer System, 6(1), Feb. 1988 pp. 51-81.

Kazar, Michael Leon, *Synchronization and Caching Issues in the Andrew File System*, Carnegie Mellon University, CMU-ITU-88-063, 1988.

Kazar, Michael L., et al., *DEcorum File System Architectural Overivew*, USENIX Summer Conference, Anaheim, California, 1990.

Kemper, Alfons, et al., *Performance Tuning for SAP R/3*, Data Engineering Journal 22, Feb. 1999 pp. 33-40.

Kent, Jack et al., *Optimizing Shadow Recovery Algorithms, IEEE Transactions on Software Engineering*, 14(2): 155-168, Feb. 1988.

Kistler, et al., *Disconnected Operation in the Coda File System*, ACM Transactions on Computer Systems, vol. 10, No. 1, Feb. 1992, pp. 3-25.

Lorie, Raymond, A. *Physical Integrity in a Large Segmented Database*, ACM Trans. Database Syst., vol. 2, Mar. 1977, pp. 91-104.

Ousterhout, John et al., *Beating the I/O Bottleneck: A Case for Log-Structured File Systems*, Technical Report, Computer Science Division, Electrical Engineering and Computer Sciences, University of Cali-fornia at Berkeley, Oct. 30, 1988.

Patterson, D., et al., *A Case for Redundant Arrays of Inexpen-sive Disks (RAID)*, Technical Report, CSD-87-391, Computer Science Division, Electrical Engineering and Computer Sciences, University of California at Berkeley 1987.

Patterson, D., et al., *A Case for Redundant Arrays of Inexpen-sive Disks (RAID)*, SIGMOD International Conference on Management of Data, Chicago, IL, USA, Jun. 1-3, 1988, SIGMOD Record (17)3:109-16 Sep. 1988.

Peterson, Zachary Nathaniel Joseph, *Data Placement for Copy-on-Write Using Virtual Contiguity*, University of CA, Santa Cruz, Master's Thesis for the Department of Science in Computer Science, Sep. 2002.

Quinlan, Sean, *A Cached WORM File System*, Software-Practice and Experience, 21(12):1289-1299 1991.

Rosenblum, Mendel, et al., *The LFS Storage Manager*, Com-puter Science Division, Electrical Engineering And Computer Sciences, Univ. of CA, presented at Summer '90 USENIX Technical Conference, Anaheim, CA Jun. 1990.

Rosenblum, Mendel, et al. *The Design and Implementation of a Log-Structured File System* Jul. 24, 1991 pp. 1-15.

Rosenblum, Mendel, *The Design and Implementation of a Log-Structured File System*, 1992 pp. 1-93.

Rosenblum, Mendel, et al., *The Design and Implementation of a Log-Structured File System*, In Proceedings of ACM Transactions on Computer Systems, (10)1:26-52, Feb. 1992.

Schiefer, Berni, et al., *DB2 Universal Database Performance Tuning*, Data Engineering Journal 22, Feb. 1999 pp. 12-19.

Seltzer, Margo I., et al., *Journaling Versus Soft Updates: Asynchronous Meta-Data Protection in File Systems*, Proceedings of 200 USENIX Annual Technical Conference, Jun. 6-23, 2000.

Shasha, Dennis, *Tuning Time Series Queries in Finance: Case Studies and Recommendations*, Data Engineering Journal 22, Feb. 1999 pp. 41-47.

Sidebotham, Bob, *Volumes: The Andrew File System Data Structuring Primitive*, EEUG Conference Proceedings, Manchester, UK, Au-tumn 1986.

Subramanian, Muralidhar, et al., *Performance Challenges in Object-Relational DBMSs*, Data Engineering Journal 22, Feb. 1999 pp. 28-32.

Weikum, Gerhard, et al., *Towards Self-Tuning Memory Man-agement for Data Servers*, Data Engineering Journal 22, Feb. 1999 pp. 3-11.

West, Michael, et al. *The ITC Distributed File System: Proto-type and Experience*, Carnegie-Mellon University, Technical Report CMU-ITC-040, Mar. 1985.

Zayas, Edward R., AFS-3 Programmer's Reference: Architectural Overivew, Transarc Corporation, Pittsburgh, PA, 1.0 edition 1991.

\* cited by examiner

SYSTEM AND METHOD FOR VERIFYING THE CONSISTENCY OF MIRRORED DATA SETS

RELATED APPLICATIONS

This application is related to the following United States patent applications:

Ser. No. 10/100,950 entitled SYSTEM AND METHOD FOR ASYNCHRONOUS MIRRORING OF SNAPSHOTS AT A DESTINATION USING A PURGATORY DIRECTORY AND INODE MAPPING, by Stephen L. Manley, et al., the teachings of which are expressly incorporated herein by reference;

Ser. No. 10/100,879, entitled FORMAT FOR TRANSMISSION OF FILE SYSTEM INFORMATION BETWEEN A SOURCE AND A DESTINATION, by Stepphen L. Manley, et al., the teachings of which are expressly incorporated herein by reference; and Ser. No. 10/776,057, entitled SYSTEM AND METHOD FOR COMPARING DATA SETS, by Daniel Ting, et al., the teachings of which are expressly incorporated herein by reference.

FIELD OF THE INVENTION

This invention relates to storage systems and more particularly to verifying the consistency of mirrored data sets on storage systems.

BACKGROUND OF THE INVENTION

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage environment, a storage area network and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

Storage of information on the disk array is preferably implemented as one or more storage "volumes" of physical disks, defining an overall logical arrangement of disk space. The disks within a volume are typically organized as one or more groups, wherein each group may be operated as a Redundant Array of Independent (or Inexpensive) Disks (RAID). Most RAID implementations enhance the reliability/integrity of data storage through the redundant writing of data "stripes" across a given number of physical disks in the RAID group, and the appropriate storing of redundant information (parity) with respect to the striped data. The physical disks of each RAID group may include disks configured to store striped data (i.e., data disks) and disks configured to store parity for the data (i.e., parity disks). The parity may thereafter be retrieved to enable recovery of data lost when a disk fails. The term "RAID" and its various implementations are well-known and disclosed in *A Case for Redundant Arrays of Inexpensive Disks (RAID)*, by D. A. Patterson, G. A. Gibson and R. H. Katz, Proceedings of the International Conference on Management of Data (SIGMOD), June 1988.

The storage operating system of the storage system may implement a high-level module, such as a file system, to logically organize the information stored on the disks as a hierarchical structure of directories, files and blocks. For example, each "on-disk" file may be implemented as set of data structures, i.e., disk blocks, configured to store information, such as the actual data for the file. These data blocks are organized within a volume block number (vbn) space that is maintained by the file system. The file system organizes the data blocks within the vbn space as a "logical volume"; each logical volume may be, although is not necessarily, associated with its own file system. The file system typically consists of a contiguous range of vbns from zero to n, for a file system of size n+1 blocks.

A known type of file system is a write-anywhere file system that does not overwrite data on disks. If a data block is retrieved (read) from disk into a memory of the storage system and "dirtied" (i.e., updated or modified) with new data, the data block is thereafter stored (written) to a new location on disk to optimize write performance. A write-anywhere file system may initially assume an optimal layout such that the data is substantially contiguously arranged on disks. The optimal disk layout results in efficient access operations, particularly for sequential read operations, directed to the disks. An example of a write-anywhere file system that is configured to operate on a storage system is the Write Anywhere File Layout (WAFL®) file system available from Network Appliance, Inc., Sunnyvale, Calif.

The storage operating system may further implement a storage module, such as a RAID system, that manages the storage and retrieval of the information to and from the disks in accordance with input/output (I/O) operations. The RAID system is also responsible for parity operations in the storage system. Note that the file system only "sees" the data disks within its vbn space; the parity disks are "hidden" from the file system and, thus, are only visible to the RAID system. The RAIID system typically organizes the RAID groups into one large "physical" disk (i.e., a physical volume), such that the disk blocks are concatenated across all disks of all RAID groups. The logical volume maintained by the file system is then "disposed over" (spread over) the physical volume maintained by the RAID system.

The storage system may be configured to operate according to a client/server model of information delivery to thereby allow many clients to access the directories, files and blocks stored on the system. In this model, the client may comprise an application, such as a database application, executing on a computer that "connects" to the storage system over a computer network, such as a point-to-point link, shared local area network, wide area network or virtual private network implemented over a public network, such as the Internet. Each client may request the services of the file system by issuing file system protocol messages (in the form of packets) to the storage system over the network. By supporting a plurality of file system protocols, such as the conventional Common Internet File System (CIFS) and the Network File System (NFS) protocols, the utility of the storage system is enhanced.

In order to improve reliability and facilitate disaster recovery in the event of a failure of a storage system, its associated disks or some portion of the storage infrastructure, it is common to "mirror" or replicate a data set comprising of some or all of the underlying data and/or the file system that organizes the data. A data set comprises an area of defined storage which may have a mirroring relationship associated therewith.

Examples of data sets include, e.g., a file system, a volume or a persistent consistency point image (PCPI), described further below.

In one example, a mirror is established and stored at a destination, making it more likely that recovery is possible in the event of a true disaster that may physically damage the source storage location or its infrastructure (e.g. a flood, power outage, act of war, etc.). The mirror is updated at regular intervals, typically set by an administrator, in an effort to maintain the most recent changes to the file system on the destination. The storage systems attempt to ensure that the mirror is consistent, that is that the mirror contains identical data to that of the source.

One common form of update involves the use of a "snapshot" process in which the active file system at the source storage site, consisting of inodes and blocks, is captured and the changes between two snapshots are transmitted, over a network (such as the well-known Internet) to the remote destination storage site. Such mirroring techniques are described in the above-incorporated U.S. patent applications. By "active file system" it is meant the file system to which current input/output operations are being directed.

Note that the term "snapshot" is a trademark of Network Appliance, Inc. It is used for purposes of this patent to designate a persistent consistency point image (PCPI). A persistent consistency point image is a point in time representation of the storage system, and more particularly, of the active file system, stored on a storage device or in other persistent memory and having a name or other unique identifier that distinguishes it from other PCPIs taken at other points in time. A PCPI can also include other information (metadata) about the active file system at the particular point in time for which the image is taken. The terms PCPI and snapshot may be used interchangeably through out this patent without derogation of Network Appliance's is trademark rights. The PCPI process is described in further detail in U.S. patent application Ser. No. 09/932,578, entitled INSTANT SNAPSHOT by Blake Lewis et al., TR3002 *File System Design for an NFS File Server Appliance* by David Hitz et al., published by Network Appliance, Inc., and in U.S. Pat. No. 5,819,292 entitled METHOD FOR MAINTAINING CONSISTENT STATES OF A FILE SYSTEM AND FOR CREATING USER-ACCESSIBLE READ-ONLY COPIES OF A FILE SYSTEM by David Hitz et al., which are hereby incorporated by reference.

An exemplary PCPI-based mirroring technique typically provides for remote asynchronous replication or mirroring of changes made to a source file system PCPI in a destination replica file system. The mirroring technique typically scans (via a scanner) the blocks that make up two versions of a PCPI of the source file system, to identify latent divergence, i.e., changed blocks in the respective PCPI files based upon differences in vbns further identified in a scan of a logical file block index of each PCPI. Trees (e.g., buffer trees) of blocks associated with the files are traversed, bypassing unchanged pointers between versions, to identify the changes in the hierarchy of the trees. These changes are transmitted to the destination replica or "mirror." This technique allows regular files, directories, inodes and any other hierarchical structure of trees to be efficiently scanned to determine differences (latent divergence) between versions thereof. A set number of PCPIs may be retained both on the source and the destination depending upon various time-based and other criteria.

Conventional mirroring and archival backup systems typically include processes to ensure that the data set is correctly mirrored, to thereby reduce the divergence of the mirror from the original source. However, errors may occur in the archival backup or mirror due to, e.g., network errors, software errors and/or physical media errors of the storage devices. As a result of such errors, the mirror/backup is not identical to the source, which may cause data loss should an error condition occur on the source system. Additionally, the file systems on either the source or destination storage systems may experience an error condition. Such a file system error may be corrected by conventional file system error correction techniques; however, such correction may exacerbate mirror divergence. To ensure that a correct mirror is on the destination, a new mirroring relationship may need to be established and an initial baseline backup operation may need to be performed of the data set. This is computationally, I/O resource and network intensive to perform and also does not guarantee that the administrator has a point in time mirror of a previous point in time. That is, the new mirror may be up to date, but does not reflect the contents of the mirrored source at a previous point in time, thereby reducing the effectiveness of the mirror.

SUMMARY OF THE INVENTION

The disadvantages of the prior art are overcome by providing a system and method for verifying the consistency of mirrored data sets between source and destination storage systems. The present invention is illustratively implemented as a verification module of a storage operating system executing on the destination storage system that cooperates with a verification daemon executing on the source storage system. When an administrator desires to verify the consistency of a mirrored data set, the administrator invokes the novel verification module (program), which connects with the verification daemon to transmit a list of persistent consistency point images (PCPIs) contained within the destination mirror that the administrator desires to verify.

The verification daemon compares the list of PCPIs with a list of local PCPIs, i.e., those PCPIs that are stored on the source, to find a common subset and then returns a list of common PCPIs to the verification module. The verification daemon also locks the set of common PCPIs for the duration of the verification procedure. Upon receiving the list of common PCPIs, the verification module locks the corresponding common PCPIs and initiates a verification process for each of them. Each verification process establishes a connection with the verification demon, which initializes a new thread (a "verification thread") for each connection. Each verification thread then transmits a stream of verification data to the appropriate destination verification process utilizing a file system independent protocol format. In an illustrative embodiment, the verification data may comprise metadata associated with the PCPI while, in alternate embodiments, the verification data may comprise checksums or the full data of the PCPI. The verification data is transmitted to the destination storage system and compared with corresponding data on the local file system by the verification module.

In an alternate embodiment of the present invention, the verification thread executing on the source transmits the complete data of the PCPI to the destination, which performs a check with its local file system. If there is a mismatch, i.e., the data from the source does not match data currently on the destination, the verification module modifies the destination file system so that it is consistent with the source file system.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

A. Network and Storage System Environment

Figure 1:
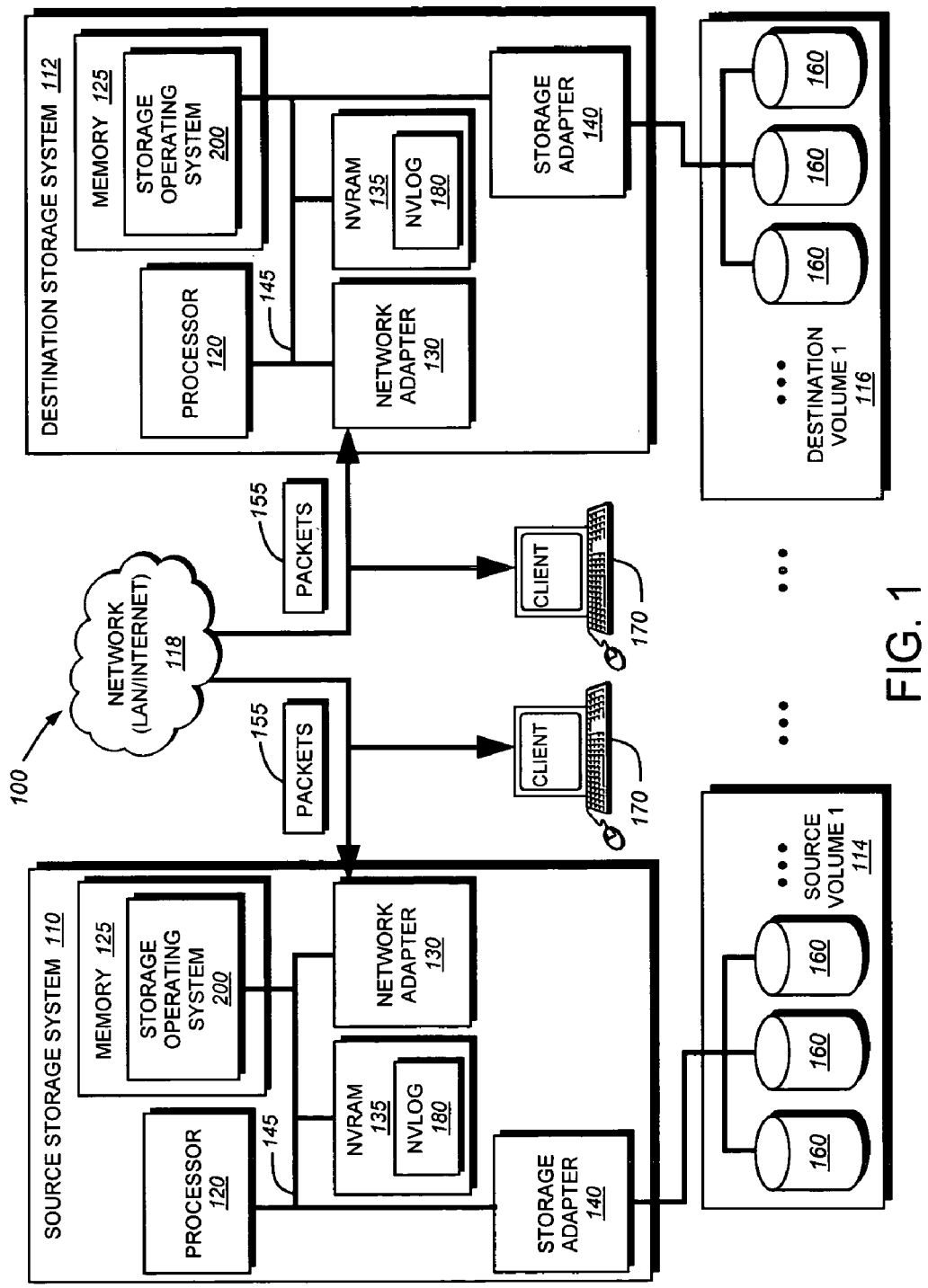
FIG. 1 is a schematic block diagram of an exemplary mirrored storage system environment in accordance with an embodiment of the present invention.

FIG. 1 is a schematic block diagram of a storage system environment 100 that includes a pair of interconnected storage systems including a source storage system 110 and a destination storage system 112 that may be advantageously used with the present invention. For the purposes of this description, the source storage system is a networked computer that manages storage on one or more source volumes 114, each comprising an array of storage disks 160 (described further below). Likewise, the destination storage system 112 manages the storage on one or more destination volumes 116 comprising arrays of disks 160. The source and destination storage systems are linked via a network 118 that can comprise a local or wide area network, such as the well-known Internet. An appropriate network adapter 130 residing in each storage system 110, 112 facilitates communication over the network 118. Also for the purposes of this description, like components in each of the source and destination storage system 110 and 112 respectively, are described with like reference numerals. As used herein, the term "source" can be broadly defined as a location from which the subject data travels during a mirroring operation and the term "destination" can be defined as the location to which the data travels. While a source storage system and a destination storage system, connected by a network, is a particular example of a source and destination used herein, a source and destination could be computers/storage systems linked via a direct link, or via loopback (a "networking" arrangement internal to a single computer for transmitting a data stream between local source and local destination), in which case the source and the destination are the same storage system.

In the particular example of a pair of networked source and destination storage systems, each storage system 110 and 112 can be any type of special-purpose computer (e.g., server) or general-purpose computer, including a standalone computer. Each storage system 110, 112 comprises a processor 120, a memory 125, a network adapter 130 and a storage adapter 140 interconnected by a system bus 145. Each storage system 110, 112 also includes a storage operating system 200 that manages data and may implement a file system to logically organize the information as a hierarchical structure of directories and files on the disks.

It will be understood to those skilled in the art that the inventive technique described herein may apply to any type of special-purpose computer (e.g., file serving appliance) or general-purpose computer, including a standalone computer, embodied as a storage system. The storage system may be further implemented as a storage appliance. An example of a multi-protocol storage appliance that may be advantageously used with the present invention is described in U.S. patent application Ser. No. 10/215,917 titled, MULTI-PROTOCOL STORAGE APPLIANCE THAT PROVIDES INTEGRATED SUPPORT FOR FILE AND BLOCK ACCESS PROTOCOLS, filed on Aug. 8, 2002. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

In the illustrative embodiment, the memory 125 comprises storage locations that are addressable by the processor and adapters for storing software program code. The memory comprises a form of random access memory (RAM) that is generally cleared by a power cycle or other reboot operation (i.e., it is "volatile" memory). The processor and adapters may, in turn, comprise processing elements and/or logic circuitry configured to execute the software code and manipulate the data structures. The operating system 200, portions of which are typically resident in memory and executed by the processing elements, functionally organizes the storage system by, inter alia, invoking storage operations in support of a file service implemented by the storage system. It will be apparent to those skilled in the art that other processing and memory means, including various computer readable media, may be used for storing and executing program instructions pertaining to the inventive technique described herein.

The network adapter 130 comprises the mechanical, electrical and signaling circuitry needed to connect each storage system 110, 112 to the network 118, which may comprise a point-to-point connection or a shared medium, such as a local area network. Moreover the source storage system 110 may interact with the destination storage system 112 in accordance with a client/server model of information delivery. That is, the client may request the services of the server, and the server may return the results of the services requested by the client, by exchanging packets 155 encapsulating, e.g., the TCP/IP protocol or another network protocol format over the network 118.

The storage adapter 140 cooperates with the storage operating system 200 executing on the storage system to access information requested by the client. The information may be stored on the disks 160 that are attached, via the storage adapter 140 to each storage system 110, 112 or other node of a storage system as defined herein. The storage adapter 140 includes input/output (I/O) interface circuitry that couples to the disks over an I/O interconnect arrangement, such as a conventional high-performance, Fibre Channel serial link topology.

Each storage system may also be interconnected with one or more clients 170 via the network adapter 130. The clients transmit requests for file service to the source and destination storage systems 110, 112, respectively, and receive responses to the requests over a LAN or other network (118). The client 170 may communicate with the storage system over network 118 by exchanging discrete frames or packets of data according to pre-defined protocols, such as the Transmission Control Protocol/Internet Protocol (TCP/IP). Moreover, the client may interact with the storage system 110, 112 in accordance with a client/server model of information delivery. That is, the client may request the services of the storage system, and the system may return the results of the services requested by the client, by exchanging packets 155 over the network 118. The clients may issue packets including file-based access protocols, such as the Common Internet File System (CIFS) protocol or Network File System (NFS) protocol, over TCP/IP when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on the disks 160, such as hard disk drivers (HDD) and/or direct attached storage devices (DASD). The storage adapter includes input/output (I/O) interface circuitry that couples to the disks over an I/O interconnect arrangement, such as a conventional high-performance, FC serial link topology.

Storage of information on disks 160 is preferably implemented as one or more storage "volumes" that comprise a collection of physical storage disks 160 cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

B. Storage Operating System

To facilitate access to the disks 160, the storage operating system 200 illustratively implements a write-anywhere file system that cooperates with virtualization modules to "virtualize" the storage space provided by disks 160. The file system logically organizes the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization modules allow the file system to further logically organize information as a hierarchical structure of blocks on the disks that are exported as named logical unit numbers (luns).

In the illustrative embodiment, the storage operating system is preferably the NetApp® Data ONTAP® operating system available from Network Appliance, Inc., Sunnyvale, Calif. that implements a Write Anywhere File Layout (WAFL®) file system. However, it is expressly contemplated that any appropriate storage operating system may be enhanced for use in accordance with the inventive principles described herein. As such, where the term "ONTAP" is employed, it should be taken broadly to refer to any storage operating system that is otherwise adaptable to the teachings of this invention.

Figure 2:
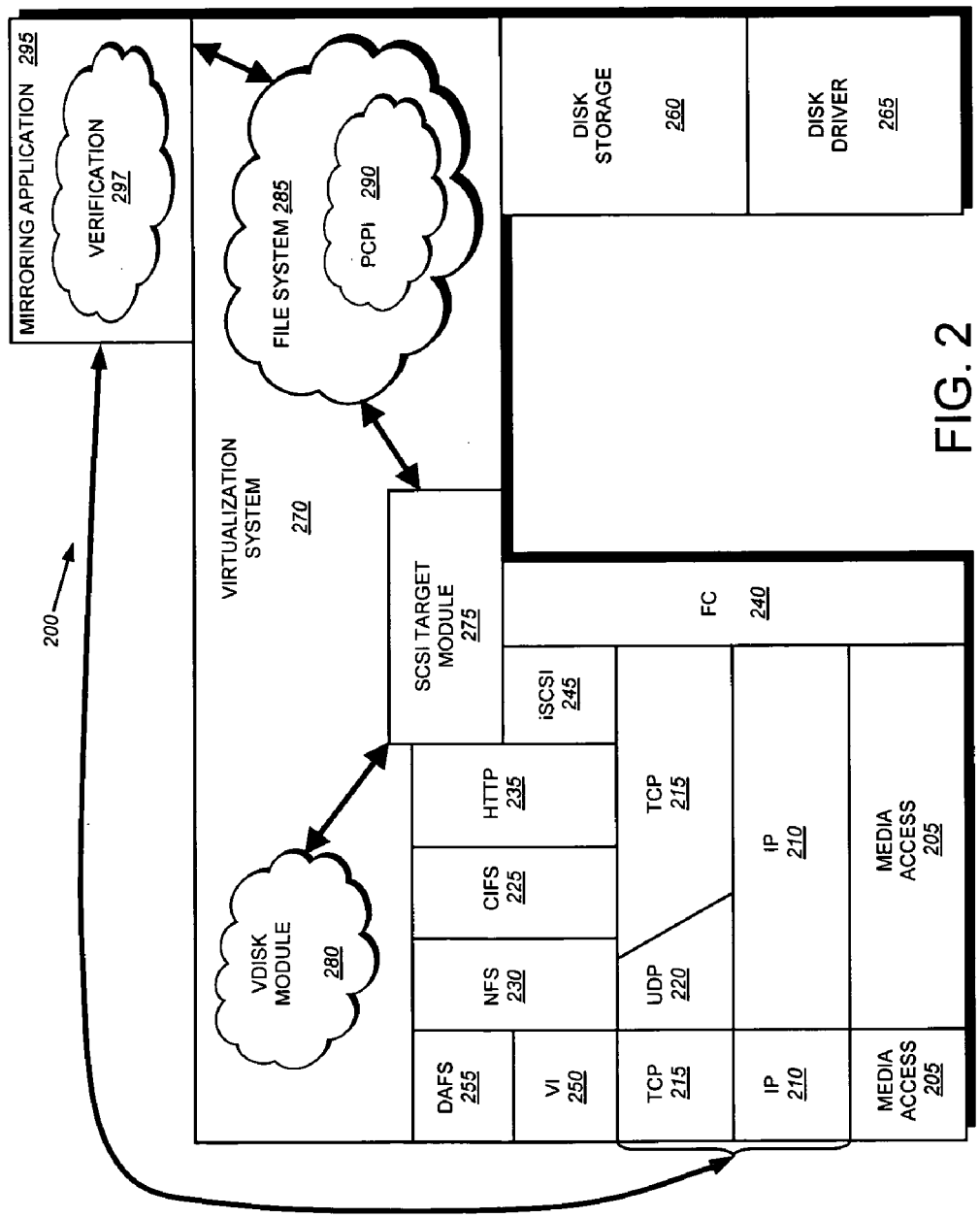
FIG. 2 is a schematic block diagram of an exemplary storage operating system in accordance with an embodiment of the present invention.

FIG. 2 is a schematic block diagram of an exemplary storage operating system 200 that may be advantageously used with the present invention. The storage operating system comprises a series of software modules organized to form an integrated network protocol stack or, more generally, a multi-protocol engine that provides data paths for clients to access information stored on the storage system using block and file access protocols. The protocol stack includes a media access layer 205 of network drivers (e.g., gigabit Ethernet drivers) that interfaces to network protocol layers, such as the IP layer 210 and its supporting transport mechanisms, the TCP layer 215 and the User Datagram Protocol (UDP) layer 220. A file system protocol layer provides multi-protocol file access and, to that end, includes support for the Direct Access File System (DAFS) protocol 255, the NFS protocol 230, the CIFS protocol 225 and the Hypertext Transfer Protocol (HTTP) protocol 235. A VI layer 250 implements the VI architecture to provide direct access transport (DAT) capabilities, such as RDMA, as required by the DAFS protocol.

An iSCSI driver layer 245 provides block protocol access over the TCP/IP network protocol layers, while a FC driver layer 240 receives and transmits block access requests and responses to and from the storage system. The FC and iSCSI drivers provide FC-specific and iSCSI-specific access control to the blocks and, thus, manage exports of luns to either iSCSI or FCP or, alternatively, to both iSCSI and FCP when accessing the blocks on the storage system. In addition, the storage operating system includes a disk storage module 260 embodied as a RAID system that manages the storage and retrieval of information to and from the volumes/disks in accordance with I/O operations, and a disk driver system 265 that implements a disk access protocol such as, e.g., the SCSI protocol.

Bridging the disk software layers with the integrated network protocol stack layers is a virtualization system 270 that is implemented by a file system interacting with virtualization modules illustratively embodied as, e.g., vdisk module 280 and SCSI target module 275. The vdisk module 280 is layered on the file system to enable access by administrative interfaces, such as a user interface (UI), in response to a user (system administrator) issuing commands to the storage system. The SCSI target is disposed between the FC and iSCSI drivers and the file system to provide a translation layer of the virtualization system between the block (lun) space and the file system space, where luns are represented as blocks.

The file system is illustratively a message-based system that provides logical volume management capabilities for use in access to the information stored on the storage devices, such as disks. That is, in addition to providing file system semantics, the file system provides functions normally associated with a volume manager. These functions include (i) aggregation of the disks, (ii) aggregation of storage bandwidth of the disks, and (iii) reliability guarantees, such as mirroring and/or parity (RAID). The file system illustratively implements the WAFL file system (hereinafter generally the "write-anywhere file system") having an on-disk format representation that is block-based using, e.g., 4 kilobyte (kB)

blocks and using index nodes ("inodes") to identify files and file attributes (such as creation time, access permissions, size and block location). The file system uses files to store metadata describing the layout of its file system; these metadata files include, among others, an inode file. A file handle, i.e., an identifier that includes an inode number, is used to retrieve an inode from disk.

Broadly stated, all inodes of the write-anywhere file system are organized into the inode file. A file system (FS) info block specifies the layout of information in the file system and includes an inode of a file that includes all other inodes of the file system. Each logical volume (file system) has an FS info block that is preferably stored at a fixed location within, e.g., a RAID group. The inode of the root FS info block may directly reference (point to) blocks of the inode file or may reference indirect blocks of the inode file that, in turn, reference direct blocks of the inode file. Within each direct block of the inode file are embedded inodes, each of which may reference indirect blocks that, in turn, reference data blocks of a file.

Operationally, a request from the client is forwarded as a packet 155 over the computer network 118 and onto the storage system where it is received at the network adapter. A network driver (of layer 205 or layer 240) processes the packet and, if appropriate, passes it on to a network protocol and file access layer for additional processing prior to forwarding to the write-anywhere file system 285. Here, the file system generates operations to load (retrieve) the requested data from disk if it is not resident "in core", i.e., in memory 125. If the information is not in the memory, the file system indexes into the inode file using the inode number to access an appropriate entry and retrieve a logical vbn. The file system then passes a message structure including the logical vbn to the RAID system 260; the logical vbn is mapped to a disk identifier and disk block number (disk,dbn) and sent to an appropriate driver (e.g., SCSI) of the disk driver system 265. The disk driver accesses the dbn from the specified disk and loads the requested data block(s) in memory 125 for processing by the storage system. Upon completion of the request, the storage system (and operating system) returns a reply to the client over the network 118.

It should be noted that the software "path" through the storage operating system layers described above needed to perform data storage access for the client request received at the storage system may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by storage system in response to a request issued by client 170. Moreover, in another alternate embodiment of the invention, the processing elements of adapters 130, 140 may be configured to offload some or all of the packet processing and storage access operations, respectively, from processor 120, to thereby increase the performance of the storage service provided by the system. It is expressly contemplated that the various processes, architectures and procedures described herein can be implemented in hardware, firmware or software.

As used herein, the term "storage operating system" generally refers to the computer-executable code operable to perform a storage function in a storage system, e.g., that manages data access and may, in the case of a file server, implement file system semantics. In this sense, the ONTAP software is an example of such a storage operating system implemented as a microkernel and including the WAFL layer to implement the WAFL file system semantics and manage data access. The storage operating system can also be implemented as an application program operating over a general-purpose operating system, such as UNIX® or Windows NT®, or as a general-purpose operating system with configurable functionality, which is configured for storage applications as described herein.

The file system 285 also includes a set of PCPI processes 290 that enable the file system to generate PCPIs of the active file system, as described further below. Also included within the storage operating system 200 is a mirroring application module 295. The mirroring application module 295 illustratively generates appropriate mirrors of data sets and manages data backups in accordance with an embodiment of the present invention. For example, the mirroring application module 295 may implement the mirroring technique described in the above-incorporated U.S. patent application Ser. No. 10/100,950, entitled SYSTEM AND METHOD FOR ASYNCHRONOUS MIRRORING OF SNAPSHOTS AT A DESTINATION USING A PURGATORY DIRECTORY AND INODE MAPPING. It should be noted that in alternate embodiments, other mirroring techniques may be utilized in accordance with the teachings of the present invention. In accordance with the illustrative embodiment, a set of verification processes 297 is associated with the mirroring application module 295. The verification processes 297, which illustratively include a verification module and a verification daemon, perform the verification of errors in accordance with the teachings of the present invention, as described further below.

C. Persistent Consistency Point Images

As noted above, in certain mirroring architectures, storage systems utilize PCPIs. For example, source storage system 110 ("source") may generate a baseline PCPI that is transferred to destination storage system 112 ("destination"). At a later point in time, the source storage system may generate a second PCPI. The mirroring application module 295 determines the changes between the baseline and the second PCPIs, with only those changes being transmitted to the destination, which may then update its file system and generate a second PCPI so that the baseline and second PCPIs are identical on both the source and destination.

PCPIs are generally created on some regular schedule that may be subject to great variation. In addition, the number of PCPIs retained by the storage system is highly variable. Under one storage scheme, a number of recent PCPIs is stored in succession (for example, a few days worth of PCPIs each taken at four-hour intervals), and a number of older PCPIs is retained at increasing time spacings (for example, a number of daily PCPIs for the previous week(s) and weekly PCPI for the previous few months). Each PCPI is stored on-disk along with the active file system, and is called into the memory 125 of the storage system as requested by the storage operating system 200 or mirroring application 295. However, it is contemplated that a variety of PCPI creation techniques and timing schemes can be implemented within the teachings of this invention.

Figure 3:
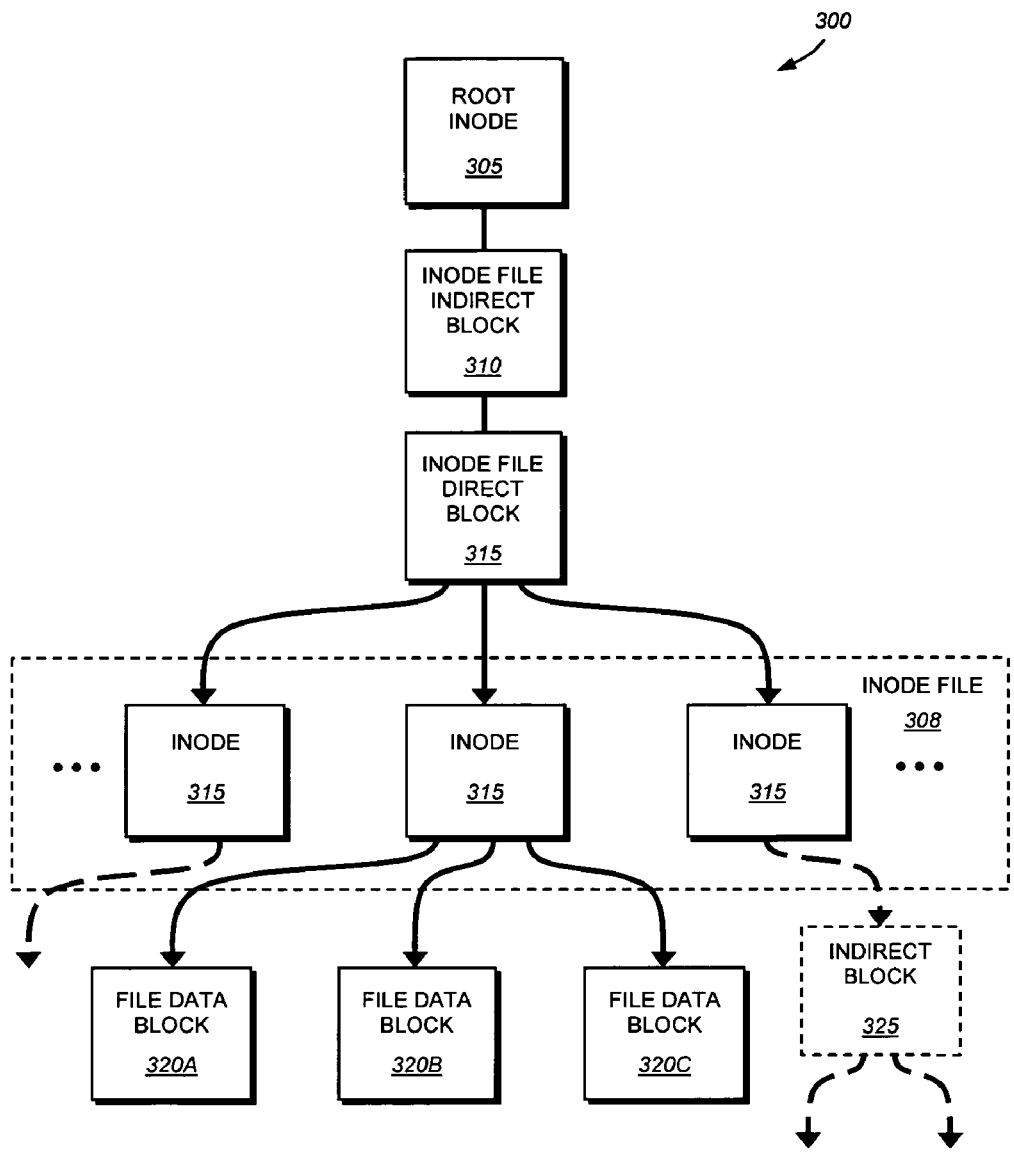
FIG. 3 is a schematic block diagram of an exemplary inode buffer tree in accordance with an embodiment of the present invention.

An exemplary file system inode structure 300 according to an illustrative embodiment is shown in FIG. 3. The inode for the inode file or more generally, the "root" inode 305 contains information describing inode file 308 associated with a given file system. In this exemplary file system inode structure root inode 305 contains a pointer to the inode file indirect block 310. The inode file indirect block 310 points to one or more inode file direct blocks 312, each containing a set of pointers to inodes 315 that make up the inode file 308. The depicted subject inode file 308 is organized into volume blocks (not separately shown) made up of inodes 315 which, in turn, contain pointers to file data (or "disk") blocks 320A, 320B and 320C. In the diagram, this is simplified to show just the inode itself containing pointers to the file data blocks. Each of the file data blocks 320(A-C) is adapted to store, in the illustrative embodiment, 4 kilobytes (KB) of data. Note, however, where more than a predetermined number of file data blocks are referenced by an inode (315), one or more indirect blocks 325 (shown in phantom) are used. These indirect blocks point to associated file data blocks (not shown).

Figure 4:
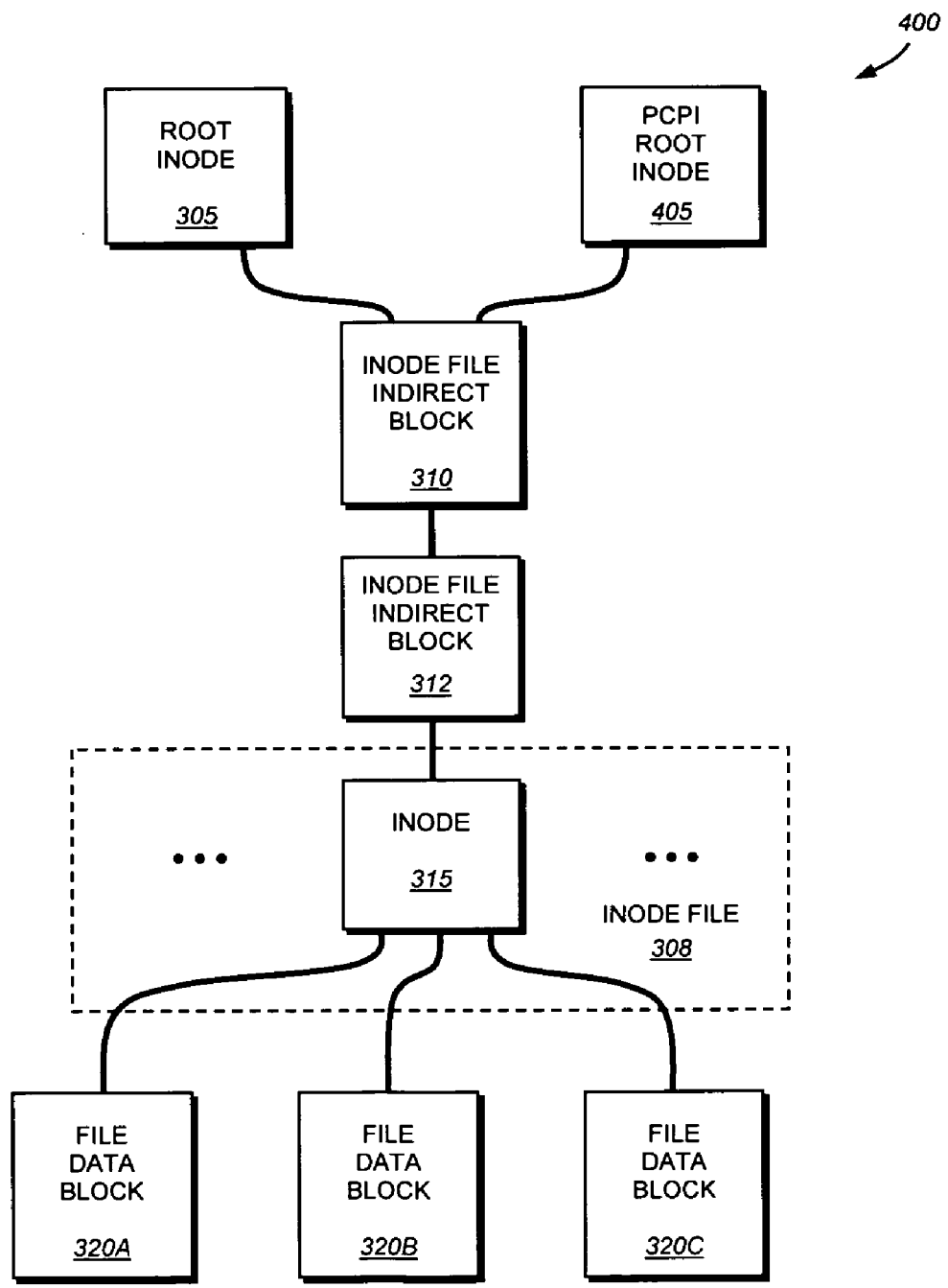
FIG. 4 is a schematic block diagram of an exemplary inode buffer tree showing a persistent consistency point image inode.

When the file system generates a PCPI of a given file system, a PCPI root inode is generated as shown in FIG. 4. The PCPI root inode 405 is, in essence, a duplicate copy of the root inode 305 of the file system 300. Thus, the exemplary file system structure 400 includes the same inode file indirect block 310, inode file direct block 312, inodes 315 and file data blocks 320(A-C) as depicted in FIG. 3. When a user modifies a file data block, the file system writes the new data block to disk and changes the active file system to point to the newly created block.

Figure 5:
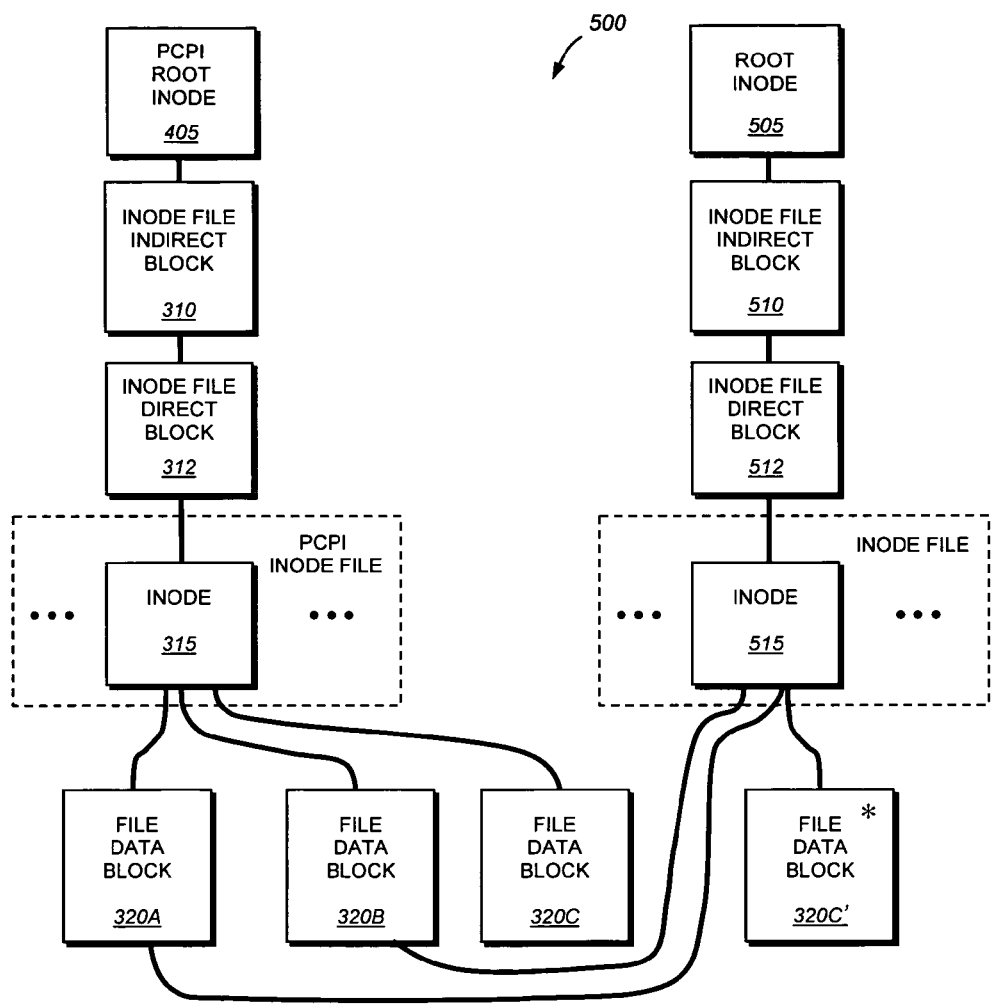
FIG. 5 is a schematic block diagram of an exemplary inode buffer tree showing the copy on write nature of a file system in accordance with an embodiment of the present invention.

FIG. 5 shows an exemplary inode file system structure 500 after a file data block has been modified. In this illustrative example, file data which is stored at disk block 320C is modified. The file system writes the modified contents to disk block 320C', which is a new location on disk. Because of this new location, the inode file data which is stored at disk block 315 is rewritten so that it points to block 320C'. This modification causes the file system to allocate a new disk block 515 for the updated version of the data at 315. Similarly, the inode file indirect block 310 is rewritten to block 510 and direct block 312 is rewritten to block 512, to point to the newly revised inode 515. Thus, after a file data block has been modified the PCPI root inode 405 contains a pointer to the original inode file system indirect block 310 which, in turn, contains a link to the inode 315. This inode 315 contains pointers to the original file data blocks 320A, 320B and 320C. However, the newly written inode 515 includes pointers to unmodified file data blocks 320A and 320B. The inode 515 also contains a pointer to the modified file data block 320C' representing the new arrangement of the active file system. A new file system root inode 505 is established representing the new structure 500. Note that metadata in any PCPI blocks (e.g. blocks 310, 315 and 320C) protects these blocks from being recycled or overwritten until they are released from all PCPIs. Thus, while the active file system root inode 505 points to new blocks 510, 512, 515 and 320C', the old blocks 310, 315 and 320C are retained until the PCPI is fully released.

In accordance with an illustrative embodiment of the present invention, the mirroring application module 295 may permit the mirroring of various PCPIs between the source and destination. This may be due to, for example, incremental changes that are sent at various points in time, which are represented within the file systems as persistent consistency point images. As described in the above-incorporated U.S. patent application entitled, SYSTEM AND METHOD FOR ASYNCHRONOUS A MIRRORING OF SNAPSHOTS AT A DESTINATION USING A PURGATORY DIRECTORY AND INODE MAPPING, two PCPIs are generated on a source. The base PCPI is utilized to perform a baseline backup to the destination. At some later point in time a second PCPI is generated, which is compared with the base PCPI to generate a set of changes that is transferred to the destination.

Illustratively, the source scans the index of logical file blocks for each PCPI searching for changed vbns between the two source PCPIs. Since disk blocks are always rewritten to new locations on the disk, differences indicate changes in the underlying inodes of the respective blocks. Unchanged block of buffer trees associated with the PCPI files are efficiently overlooked, as their inodes are unchanged. The source selects inodes from changed blocks specifically associated with the data to be mirrored by identifying versions of inodes that have changed between the two PCPIs and selects the changed versions. If the inodes are the same, but the files have changed (e.g. based upon different generation numbers in the inodes) the two versions of the respective inodes are both selected. The changed versions of the inodes (between the two PCPIs) are queued and the changes in underlying blocks are identified via their block pointers, as changed inodes in one version will point to different data blocks than those in the other version. Only the changes in the trees are transmitted over the network for update of the destination file system in an asynchronous (lazy write) manner.

D. Verification of Mirrors and Archive Backups

The present invention provides a system and method for verifying the consistency of mirrors and archival backups between source and destination storage systems. The present invention is illustratively implemented as verification module of a storage operating system executing on the destination storage system that cooperates with a verification daemon executing on the source storage system. When an administrator desires to verify the consistency of a mirror (or other archival backup), the administrator invokes the novel verification module which connects with the verification daemon to transmit a list of PCPIs contained within the mirror that it desires to verify.

The verification daemon compares the list of PCPIs with a list of local PCPIs, i.e., those PCPIs that are stored on the source, to find a common subset and then returns a list of common PCPIs to the verification module. Upon receiving the list of common PCPIs, the verification module locks the corresponding common PCPIs and initiates a verification process for each of them. Each verification process establishes a connection with the verification demon, which initializes a new thread (a "source thread") for each connection. Each source thread then transmits a stream of verification data desired by the destination to the appropriate destination verification process. In an illustrative embodiment, the verification data may comprise metadata associated with the PCPI, which in alternate embodiments, the verification data checksums or may comprise the complete data of the PCPI. The verification data is transmitted to the destination storage system and compared with corresponding data on the local file system by the verification module.

Figure 6:
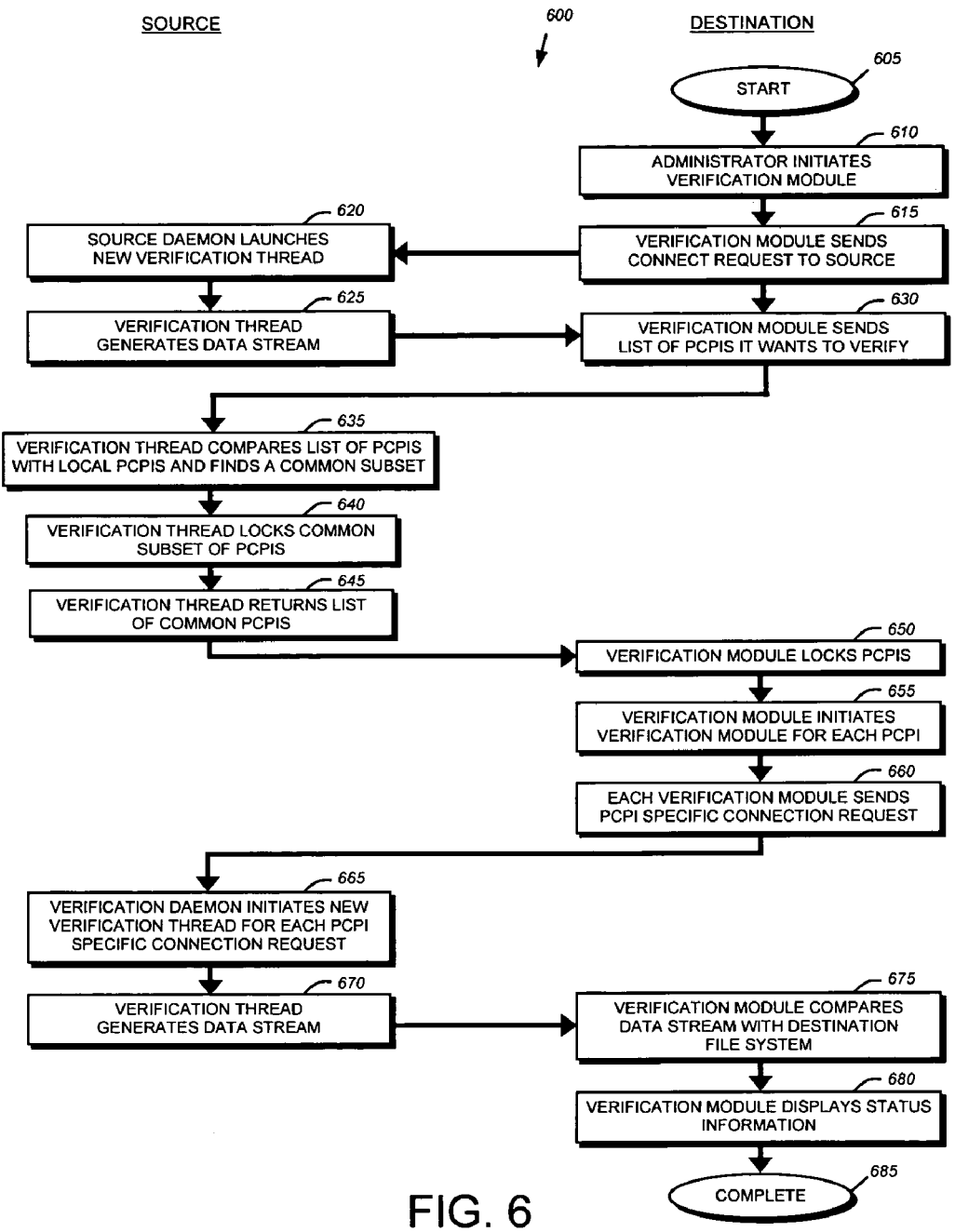
FIG. 6 is a flowchart detailing the steps of a procedure for verifying a mirror in accordance with an embodiment of the present invention.

FIG. 6 is a flowchart detailing the steps of a procedure 600 for verifying the consistency of a mirror (or other archival data backup) in accordance with an illustrative embodiment of the present invention. The procedure 600 begins in step 605 and continues to step 610 where an administrator invokes (initiates) the novel verification module of the present invention. The verification module may be initialized via a command line interface (CLI) command or may be accessed via a graphical user interface (GUI). Illustratively, the verification module is embodied as part of the verification process 297. In alternate embodiments, the verification module may be automatically invoked. For example, the system administrator may configure the storage system so that the verification module executes on a daily basis or may, for example, configure the verification module to execute at the conclusion of any mirroring activity. When invoking the verification module, the administrator identifies a list of PCPIs to be verified.

An exemplary CLI command is:

mirror check start [-L {data | checksum}] [-d<PCPI name>] [-Q] [-S<source>]<destination> where mirror check start identifies that the checking functionality of the mirroring application should be initiated. The -L option permits the administrator to identify a data comparison level, namely either data or checksum. The data level causes all data blocks to be compared on a byte-by-byte basis. The checksum level utilizes RAID checksums to compare data blocks, which expedites the verification procedure, but may be less accurate. The -d option enables the administrator to identify a list of one or more specific PCPIs by name that are be used on the destination. The -Q option enables the administrator to compare file metadata but not file data, which expedites the verification procedure, but may not identify all divergences in file contents. As an alternative, the -Q option may also verify a portion of file data, i.e., a sub-portion of the file data. The -S option permits an administrator to identify a source storage system and volume. It should be noted that the CLI command will verify that the identified source is in a mirror relationship before executing. Thus, should an administrator identify a source that is not in a mirroring relationship, the command will fail. The <destination> field identifies the destination volume that is to be verified.

In response, the verification module, in step 615, sends a connection request to the verification daemon executing on the source storage system. The verification daemon executing on the source storage system receives the connection request and, in step 620, launches a new thread (a "verification thread") to process the received connection request. Then, in step 625, the verification thread, returns an acknowledgment to the verification module. In response to receiving the acknowledgment, the verification module, in step 630, sends a list of PCPIs that the administrator desires to verify to the verification thread. As noted above, this list of PCPIs illustratively may be identified using the -d option to the verification module.

The verification thread compares the received list of PCPIs with the local PCPIs, i.e., those PCPIs that are currently stored on the source storage system, and identifies a common subset between the desired PCPIs and the local PCPIs. The verification thread then, in step 640, locks the common subset of PCPIs on the source storage system to pre-vent the file system and/or other users from modifying and/or deleting these PCPIs until the verification procedure 600 has completed. Once the common subset of PCPIs has been locked, the verification thread returns the list of the common PCPIs to the verification module in step 645. In response, the verification module locks the PCPIs on the destination storage system to ensure that a user may not delete or otherwise modify the destination PCPIs until the verification has been completed. Then, in step 655, the verification module initiates (spawns) a separate verification process for each PCPI to be verified. In step 660, each verification process, sends a PCPI specific verification connection request to the source storage system. Upon receiving the PCPI specific connection request, the verification daemon, in step 665, initiates a new verification thread for each PCPI specific connection request. These new verification threads may be initiated by generating a new thread within the verification daemon to process operations specific to the identified PCPI. Thus, in the illustrative embodiment, a separate verification thread in conjunction with a verification process manages the verification of each of the common subset of PCPIs. It should be noted that in alternate embodiments, all of the common subset of PCPIs may be managed by single verification thread and/or verification process.

Each verification thread generates the appropriate data stream in step 670. In the illustrative embodiment, the data stream may comprise the entire data of the PCPI. In alternate embodiments, the administrator may, by using the -L option, cause only check-sum information to be transferred. Illustratively, the data stream is in a format that is utilized by the mirroring application of the storage operating system. One exemplary format is described further below. In step 675, the verification process compares the received data stream with the destination file system. Upon completion of the receipt of the data stream, the verification process displays appropriate status information in step 680 before the procedure completes in step 685. This status information may include, for example, that the verification process has detected that one of the PCPIs is not consistent with the received data stream.

In the illustrative embodiment, verification may only occur on a single PCPI at a time, there is no need to determine a common subset of PCPIs as described above in reference to procedure 600. However, in an alternate embodiment that permits parallel verification of PCPIs, a procedure similar to that described above in reference to procedure 600 may be utilized in selecting a common subset of PCPIs.

E. Communication Between Source and Destination

Illustratively, a file system-independent format is used to transmit a data stream of changed data over the network. This format consists of a set of standalone headers with unique identifiers. Some headers refer to follow-on data and others carry relevant data within the stream. For example, the information relating to any source PCPI deleted files are carried within "deleted files" headers. All directory activity is transmitted first, followed by file data. File data is sent in chunks of varying size, separated by regular headers until an ending header (footer) is provided. At the destination, the format is unpacked and inodes contained therein are transmitted over the network and mapped to a new directory structure. Received file data blocks are written according to their offset in the corresponding destination file. An inode map stores entries which map the source's inodes (files) to the destination's inodes (files). The inode map also contains generation numbers. The tuple of (inode number, generation number) allows the system to create a file handle for fast access to a file. It also allows the system to track changes in which a file is deleted and its inode number is reassigned to a newly created file.

To facilitate construction of a new directory tree on the destination, an initial directory stage of the destination mirror process receives source directory information via the format and moves any deleted or moved files to a temporary or "purgatory" directory. The purgatory files which have been moved are "hard linked," i.e., appropriate directory entries are created in the directories to which they have been moved. Newly created source files are entered into the inode map and built into the directory tree. After the directory tree is built, the transfer of file data begins. Changes to file data from the source are written to the corresponding replica files (as identified by the inode map). When the data stream transfer is complete, the purgatory directory is removed and any unlinked files (including various deleted files) are permanently deleted. In one embodiment, a plurality of discrete source qtrees or other sub-directory derived from different source volumes can be replicated/mirrored on a single destination volume.

In the illustrative embodiment, the data stream format utilized to facilitate trans-mission between the source and destination storage systems is the same data stream format used by the original mirroring or backup of mirroring application. The data stream is fully described in the above-incorporated U.S. patent application Ser. No. 10/100,879 entitled FORMAT FOR TRANSMISSION OF FILE SYSTEM INFORMATION BETWEEN A SOURCE AND A DESTINATION. However, it should be noted that in alternate embodiments, the data stream may take on varying formats. The data stream is described further below. In general, its use is predicated upon having a structure that supports multiple protocol attributes (e.g. Unix permissions, NT access control lists (ACLs), multiple file names, NT streams, file type, file-create/modify time, etc.). The format also identifies the data in the stream (i.e. the offset location in a file of specific data or whether files have "holes" in the file offset that should remain free). The names of files are also relayed by the format. More generally, the format is independent of the underlying network protocol or device (in the case of a tape or local disk/non-volatile storage) protocol and file system—that is, the information is system "agnostic," and not bound to a particular operating system software, thereby allowing source and destination systems of different vendors to share the information. The format is, thus, completely self-describing requiring no information outside the data stream. In this manner a source file directory of a first type can be readily translated into destination file directory of a different type. The format also allows extensibility, in that newer improvements to the source or destination operating system does not affect the compatibility of older versions. In particular, a data set (e.g. a new header) that is not recognized by the operating system is ignored or dealt with in a predictable manner without triggering a system crash or other unwanted system failure (i.e. the stream is backwards compatible). This format also enables transmission of a description of the whole file system, or a description of only changed blocks/information within any file or directory. In addition, the format generally minimizes network and processor overhead.

Figure 7:
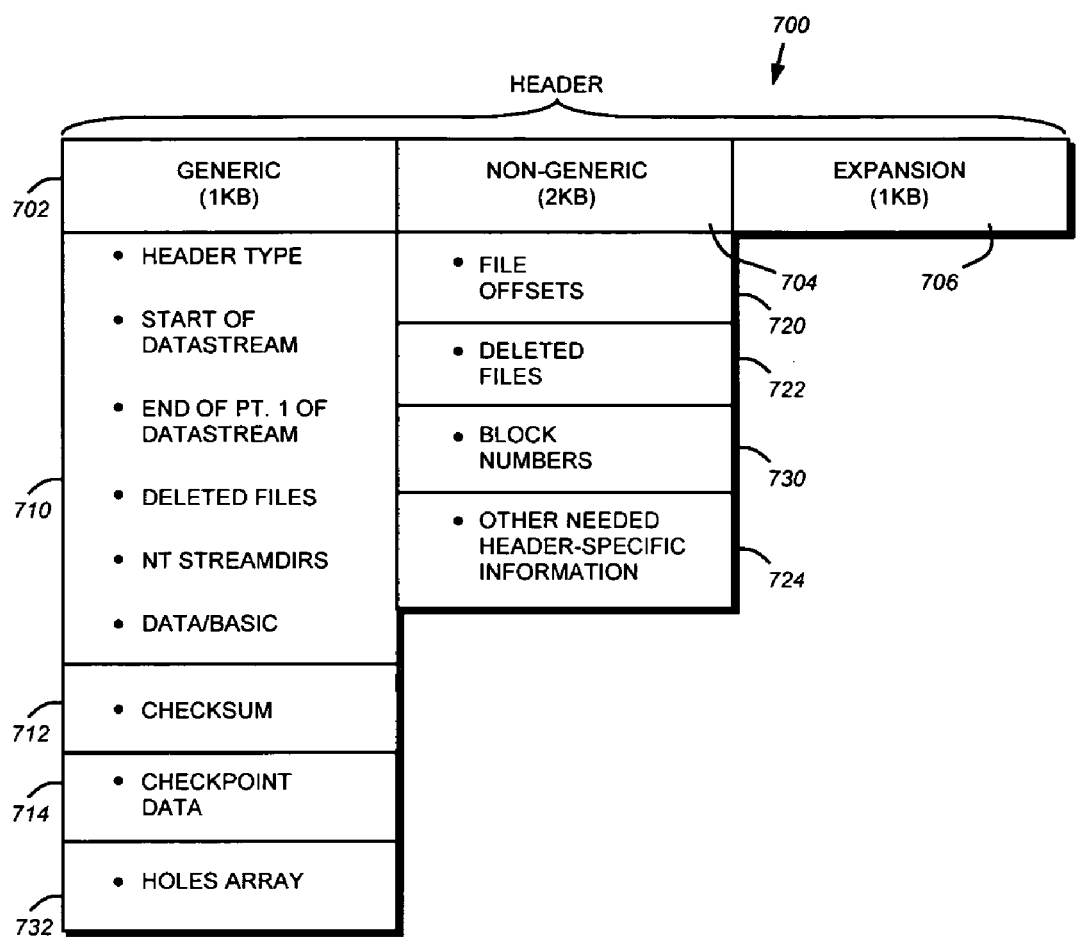
FIG. 7 is a schematic block diagram of an exemplary data stream in accordance with an embodiment of the present invention.
Figure 8:
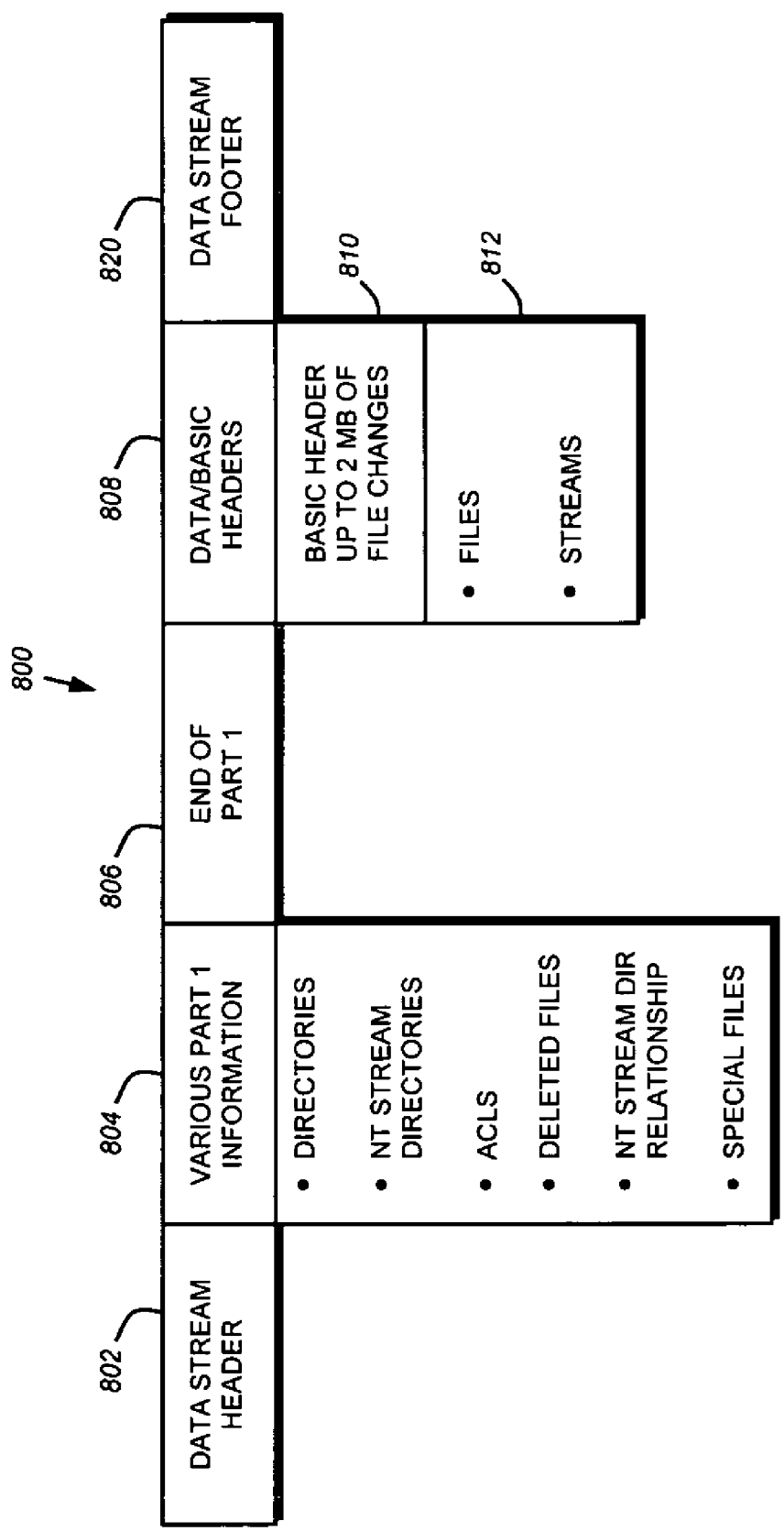
FIG. 8 is a schematic block diagram of an exemplary data stream in accordance with an embodiment of the present invention.

The format into which source PCPI changes are organized is shown schematically in FIGS. 7 and 8. The format is illustratively organized around 4 KB blocks. The header size and arrangement can widely vary in alternate embodiments, however. There are 4 KB headers that are identified by certain "header types." Basic data stream headers are ("data") are provided for at most every 2 megabytes (2 MB) of changed data. With reference to FIG. 7, the 4 KB standalone header includes three parts, a 1 KB generic part 702, a 2 KB non-generic part 704, and a 1 KB expansion part 706. The expansion part is not used, but is available for later versions.

The generic part 702 contains an identifier of header type 710. Standalone header types (i.e. headers not followed by associated data) can indicate a start of the data stream; an end of part one of the data stream; an end of the data stream; a list of deleted files encapsulated in the header; or the relationship of any NT stream directories. Later versions of Windows NT allow for multiple NT "streams" related to particular filenames. A discussion of streams is found in U.S. Pat. No. 6,643,654 B1, entitled SYSTEM AND METHOD FOR REPRESENTING NAMED DATA STREAMS WITHIN AN ON-DISK STRUCTURE OF A FILE SYSTEM, by Kayuri Patel, et al, the teachings of which are expressly incorporated herein by reference. Also in the generic part 702 is a checksum 712 that ensures the header is not corrupted. In addition other data such as a "check-point" 714 used by the source and destination to track the progress of replication is provided. By providing a list of header types, the destination can more easily operate in a backwards-compatible mode—that is, a header type that is not recognized by the destination (provided from a newer version of the source) can be more easily ignored, while recognized headers within the limits of the destination version are processed as usual.

The kind of data in the non-generic part 704 of the header 700 depends on the header type. It could include information relating to file offsets 720 in the case of the basic header, used for follow-on data transmission, deleted files 722 (in a standalone header listing of such files that are no longer in use on the source or whose generation number has changed), or other header-specific information 724 (to be described below). Again, the various standalone headers are interposed within the data stream format at an appropriate location. Each header is arranged to either reference an included data set (such as deleted files) or follow-on information (such as file data).

FIG. 8 describes the format of the illustrative replication data stream in further detail. The format of the replicated data stream is headed by a standalone data stream header 802 of the type "start of data stream." This header contains data in the non-generic part 704 generated by the source describing the attributes of the data stream.

Next a series of headers and follow-on data in the format 1020 define various "part 1" information 804. Significantly, each directory data set transmitted is preceded by a basic header with no non-generic data. Only directories that have been modified are transmitted, and they need not arrive in a particular order. Note also that the data from any particular directory need not be contiguous. Each directory entry is loaded into a 4 KB block. Any overflow is loaded into a new 4 KB block. Each directory entry is a header followed by one or more names. The entry describes an inode and the directory names to follow. NT stream directories are also transmitted.

The part 1 format information 804 also provides access control list ACL information for every file that has an associated ACL. By transmitting the ACLs before their associated file data, the destination can set ACLs before file data is written. ACLs are transmitted in a "regular" file format. Deleted file information (described above) is sent with such information included in the non-generic part 704 of one or more standalone headers (if any). By sending this information in advance, a directory tree builder can differentiate between moves and deletes.

The part 1 format information 804 also carries NT stream directory (streamdir) relationship information. One or more standalone headers (if any) notifies the destination file server of every changed file or directory that implicates NT streams, regardless of whether the streams have changed. This information is included in the non-generic part 704 of the header 700 (FIG. 7).

Finally, the part 1 format information 804 includes special files for every change in a symlink, named pipe, socket, block device, or character device in the replicated data stream. These files are sent first, because they are needed to assist the destination in building the infrastructure for creation of the replicated file system before it is populated with file data. Special files are, like ACLs, transmitted in the format of regular files.

Once various part 1 information 804 is transmitted, the format calls for an "end of part 1 of the data stream" header 806. This is a basic header having no data in the non-generic part 704. This header tells the destination that part 1 is complete and to now expect file data.

After the part 1 information, the format presents the file and stream data 808. A basic header 810 for every 2 MB or less of changed data in a file is provided, followed by the file data 812 itself. The files comprising the data need not be written in a particular order, nor must the data be contiguous. Illustratively, the file and stream data 808 contains the checksum information utilized in accordance with the illustrative embodiment to verify a PCPI on a destination.

In addition, referring to the header in FIG. 7, the basic header includes a block numbers data structure 730, associated with the non-generic part 704 works in conjunction with the "holes array" 732 within (in this example) the generic part 702. The holes array denotes empty space. This structure, in essence, provides the mapping from the holes array to corresponding blocks in the file. This structure instructs the destination where to write data blocks or holes.

In general files 812 are written in 4 KB chunks with basic headers at every 512 chunks (2 MB), at most. Likewise, streams (also 812) are transmitted like regular files in 4 KB chunks with at most 2 MB between headers. Finally, the end of the replicated data stream format is marked by a footer 820 consisting of standalone header of the type "end of data stream." This header has no specific data in its non-generic part 704 (FIG. 7).

The foregoing description has been directed to specific embodiments of this invention. It will be apparent, however, that other variations and modifications may be made to the described embodiments, but the attainment of some or all of their advantages. For instance, it is expressly contemplated that the teachings of this invention can be implemented as software, including a computer-readable medium having program instructions executing on a computer, hardware, firmware, or a combination thereof. Accordingly, this description is to be taken by way of example of and not to otherwise limit the scope of the invention. Therefore, it is the object of the appended claims to cover all such variations and modifications as come within the true spirit and scope of the invention.

What is claimed is:

1. A method for verifying consistency of one or more data sets located on a destination storage system with one or more data sets on a source storage system, comprising:
   determining a common subset of data sets on the source and destination storage system;
   initiating a data stream, for each data set of the common subset data sets, from the source storage system to the destination storage system; and
   comparing the received data stream with one of the one or more data sets located on the destination storage system.

2. The method of claim 1 wherein the step of determining a common subset of data sets on the source and destination storage systems further comprises:
   sending, from the destination storage system to the source storage system, a list of desired data sets; and
   comparing, at the source storage system, the list of desired data sets with a list of local data sets to determine the common subset of data sets.

3. The method of claim 1 wherein the data stream comprises checksum information.

4. The method of claim 1 wherein the data stream comprises metadata information.

5. The method of claim 1 wherein the data sets comprise persistent consistency point images.

6. The method of claim 1 wherein the step of determining the common subset of data sets on the source and destination storage system further comprises:
   sending, by the destination storage system to the source storage system, a list of data sets to be verified; and
   identifying the common subset of data sets at the source storage system by comparing a list of data sets serviced by the source storage system with the list of data sets to be verified.

7. The method of claim 6 further comprising the step of locking the common subset of data sets on the source storage system.

8. The method of claim 7 further comprising the step of sending a list of the common subset of data sets to the destination storage system.

9. A system for verifying consistency of one or more data sets located on a destination storage system with one or more data sets located on a source storage system, the system comprising:
   means for determining a common subset of data sets on the source and destination storage systems;
   means for initiating a data stream, for each data set of the common subset of data sets, from the source storage system to the destination storage system; and
   means for comparing the received data stream with one of the one or more located on the destination storage system.

10. The system of claim 9 wherein the means for determining a common subset of data sets on the source and destination storage system further comprises:
    means for sending, from the destination storage system to the source storage system, a list of desired data sets; and
    means for comparing, at the source storage system, the list of data sets with a list of local data sets to determine the common subset of data sets.

11. The system of claim 9 wherein the data stream comprises checksum information.

12. The system of claim 9 wherein the data stream comprises metadata information.

13. The system of claim 9 wherein the data sets comprise persistent consistency point images.

14. The system of claim 9 wherein the means for determining the common subset of data sets on the source and destination storage system further comprises:
    means for sending, by the destination storage system to the source storage system, a list of data sets to be verified; and
    means for identifying the common subset of data sets at the source storage system by comparing a list of data sets serviced by the source storage system with the list of data sets to be verified.

15. The system of claim 14 further comprising means for locking the common subset of data sets on the source storage system.

16. The system of claim 15 further comprising means for sending a list of the common subset of data sets to the destination storage system.

17. A computer readable medium for verifying consistency of one or more data sets located on a destination with one or more data sets located on a source, the computer readable medium including program instructions for performing the steps of:
    determining a common subset of data sets on the source and destination;
    initiating a data stream, for each data set of the common subset data sets, from the source to the destination; and
    comparing the received data stream with one of the one or more data sets located on the destination.

18. The computer readable medium of claim 17 wherein the step of determining the common subset of data sets on the source and destination storage system further comprises the steps of:
    sending, by the destination storage system to the source storage system, a list of data sets to be verified; and identifying the common subset of data sets at the source storage system by comparing a list of data sets serviced by the source storage system with the list of data sets to be verified.

19. A system for verifying consistency of one or more data sets, the system comprising:

a source storage system having one or more local data sets, the source storage system executing a verification daemon;

a destination storage system executing a verification module;

wherein the verification module is adapted to compare a data stream generated by the verification daemon with a data set on the destination storage system.

20. The system of claim 19 wherein the data sets comprise persistent consistency point images.

21. The system of claim 19 wherein the verification module is adapted to transmit a list of desired data sets to the verification daemon and wherein the verification daemon is adapted to identify a common subset of data sets.

22. The system of claim 19 wherein the data stream generated by the verification daemon comprises checksum information.

23. The system of claim 19 wherein the verification module is further adapted to alert an administrator of an inconsistency between the data stream generated by the verification daemon and the data set on the destination storage system.

24. The system of claim 19 wherein the verification module and verification daemon are adapted to enable a plurality of data sets to be verified in parallel.

25. The system of claim 19 wherein the data stream comprises of checksum information associated with the data sets.

26. The system of claim 19 wherein the data stream comprises of metadata information associated with the data sets.

27. The system of claim 19 wherein the data stream comprises of data contained in the data sets.

* * * * *

UNITED STATES PATENT AND TRADEMARK OFFICE
CERTIFICATE OF CORRECTION

PATENT NO. : 7,464,238 B1     Page 1 of 1
APPLICATION NO. : 11/414051
DATED : December 9, 2008
INVENTOR(S) : Vikas Yadav It is certified that error appears in the above-identified patent and that said Letters Patent is hereby corrected as shown below:

Col. 1, Line 17, please amend as shown:

A SOURCE AND A DESTINATION, by [[Stepphen]]Stephen L. Man-

Col. 15, Line 43, please amend as shown:

"header types." Basic data stream headers [[is]] ("data") are

Col. 15, Line 63, please amend as shown:

other data such as a [["check-point"]]"checkpoint" 714 used by the source and

Col. 17, Line 40, please amend as shown:

subset of data sets, from the source storage system to the

Col. 18, Line 59, please amend as shown:

subset of data sets, from the source to the destination; and

Signed and Sealed this

Twenty-fifth Day of May, 2010

David J. Kappos
*Director of the United States Patent and Trademark Office*